United States Patent Office 3,326,823
Patented June 20, 1967

3,326,823
WATER ADSORBENT POLYURETHANE SPONGE AND PROCESS FOR PREPARING SAME
Yvan Landler, Sceaux Seine, Pierre Lebel, Rueil-Malmaison, Siene-et-Oise, and Joseph Reygrobellet, Meaux, Seine-et-Marne, France, assignors to Pneumatiques, Caoutchouc Manufacture et Plastiques Kleber Colombes, Colombes, Seine, France, a French body corporate
No Drawing. Filed Nov. 29, 1963, Ser. No. 327,053
Claims priority, application France, Nov. 28, 1962, 916,940
4 Claims. (Cl. 260—2.5)

The present invention relates to a process for improving the absorbence of polyurethane sponges.

By sponges are to be understood flexible cellular objects with open cells, which cells may intercommunicate.

By polyurethanes are also understood the polyether-polyurethanes as well as the polyester-polyurethanes; they are generally obtained by the action of polyethers or of polyesters upon organic poly-isocyanates or polythioisocyanates and are already well known to one skilled in the art.

The first quality required of a sponge is to be absorbent: this property is shown by means of the following experiment:

A sponge is placed on the surface of a deep receptacle containing water; if the material floats on the surface of the water and its cells do not fill with water the sponge is said to be hydrophobic.

On the contrary if the sponge is absorbent the cells fill with water and the sponge sinks to the bottom of the receptacle.

Natural sponges are much valued because they easily absorb water, but as they are expensive, synthetic sponges have been produced using materials from the chemical industry.

Cellulose sponges are extensively known for their good feel and appearance, since they are light and easily wetted. Polyurethane sponges are much cheaper and have the advantage that they are more resistant to the action of solvents and detergents, but their use is limited as a result of their marked hydrophobic character. When these sponges are used to wipe a wet surface, water remains upon this surface even after being wiped several times.

Numerous processes have been suggested to make polyurethane sponges absorbent.

(a) The suggestion has been made that polyurethane sponges be coated with a product which is hydrophilic but insoluble in water; such products can be deposited by impregnating the sponge with a solution or an emulsion of the product in a suitable solvent and then evaporating the solvent.

(b) The sponge can similarly be impregnated with a solution or an emulsion of a hydrophobic product in a solvent. This hydrophobic product is subjected, after the evaporation of the solvent, to a chemical reaction such as, for example, saponification, in order to introduce into it hydrophilic groups while maintaining the insolubility in water of the coating formed on the surface of the cells.

(c) The sponge may also be treated with a product which is soluble in water; in this case the introduction is effected by means of an aqueous solution; after evaporating the water this water-soluble coating is subjected to certain chemical reactions, such as, for example, esterification or aldolisation, under the effect of which the coating becomes insoluble in water but nontheless retains sufficient of its hydrophilic property to increase the absorbence of the sponge.

A further process consists in fixing on the sponge, by means of the chemical reaction known as grafting, a hydrophilic compound or a compound which may be made hydrophilic by a treatment subsequent to the grafting reaction, such as a saponification or oxidation; it has been noted that in this case the best results were obtained by grafting the hydrophilic compound not on the sponge but on the starting material, i.e. the polyethers or polyesters which were used to produce the sponge; a monomer, the polymer of which is hydrophilic but does not react with the isocyanate group is then grafted.

The applicants have discovered that polyurethane sponges prepared from the starting materials comprising on the one hand a hydrophilic compound which is insoluble in water and on the other hand a grafted polyether or polyester show an abnormal increase in their absorbent character and that there is no simple addition of their two effects on the sponge.

This surprising improvement will be shown by the following examples which are in no way limiting, and in which the absorbent character of a sponge is quantitatively measured in the following manner:

50 g. of water is pipetted to cover a smooth glass surface measuring a 50 x 50 cm., and the sponge to be examined is passed over this surface without pressure. The sponge absorbs a quantity of the water spread over the smooth surface, and this quantity can be weighed. The weight of water collected allows the absorbent character of a sponge to be measured and various sponges to be compared in this respect. All the parts shown are parts by weight.

*Example 1*

The sponges prepared in this example are prepared from a polyether, an isocyanate, and an activator in the form of an activating mixture which will be indicated in the examples by the letters A.M., the composition of which is as follows:

| | Parts |
|---|---|
| Triethylene diamine | 10.72 |
| $H_2O$ | 71.43 |
| Silicone oil | 17.85 |

The sponge is prepared on the basis of the following mixture:

| | Parts |
|---|---|
| Napiol 3,500 (molecular weight 2025) | 63.9 |
| Toluene diisocyanate | 28.2 |
| A.M. | 3.2 |

The Napiol 3,500 is a propylene oxide adduct of glycerine.

After foaming and hardening this mixture at ambient temperature a sample sponge is cut out, having a volume of 190 cc. and weighing 9.7 g. This sponge does not sink when placed in water; when it is used to sponge a smooth wet surface it absorbs 3 g. of water, which corresponds to 16 mg. of water per cc. of sponge or 0.31 g. of water per gram of sponge. This ordinary polyether-polyurethane sponge has a marked hydrophobic character and will allow the different improvements contributed by the processes of the prior art and the process which is the object of the present invention to be compared.

*Example 2*

In order to improve the attraction of the above mentioned sponge to water, it is known to introduce hydrophilic compounds. Thus the preceding example is repeated but a quantity of 1 g. of cellulose is added before foaming. After foaming hardening a sponge of volume 182 cc. weighing 10 g. is cut out of the mixture; the sponge does not sink and collects 4.5 g. of water which corresponds to 5 mg. of water per cc. of sponge or 0.45 g. of water per gram of sponge. The improvement in absorbency of the sponge due to this cellulose addition is therefore 9 mg. of water per cc. of sponge or 56%.

Example 3

The grafting of a starting material being used in the preparation of a polyurethane sponge is also known.

500 g. of Napiol 3,500 is taken and subjected for 1 hour at ordinary temperature to a current of oxygen which bubbles through the liquid. The rate of passage of oxygen is 450 litres per hour and this oxygen contains 18 mmg. of ozone per litre. After ozonisation 100 g. of acrylamide is added to the Napiol and this is well distributed in the polyether. Grafting is effected by heating under vacuum for an hour at 130° C. This grafted polyether forms part of the constituent parts of a sponge constituted as follows:

| | Parts |
|---|---|
| Grafted Napiol | 3.2 |
| Non-grafted Napiol | 60.7 |
| Toluene diisocyanate | 30 |
| A.M. (as in Example 1) | 3.2 |

After foaming and hardening, a sample of sponge is cut out which has a volume of 165 cc. and weighs 6 g. This sponge sinks when placed on top of a bath of water. It collects 9.7 g. of water in the wiping test: i.e. a quantity of 60 mg. of water per cc. of sponge, or 1.6 grams of water per gram of sponge.

The improvement in absorbence due to the grafting of one of the starting materials used in the preparation of the sponge is thus 44 mg. of water per cc. of sponge, or 275%.

Example 4

The same sponge is prepared as in Example 3 but before foaming 1 g. of cellulose powder is dispersed in the mixture. After foaming and hardening a sample sponge having a volume of 220 cc. and weighing 8.2 g. is cut out and when this sponge is placed on top of a bath of water it sinks. In the wiping tests it collects 25.3 g. of water or 115 mg. per cc. of sponge or 3.1 g. of water per gram of sponge. The improvement in absorbency due to the addition of cellulose and to the grafting on to the starting materials of the sponge which is simultaneously produced is thus 99 mg. per cc. of sponge or 618%.

It is to be noted that the simple addition of the effects of the cellulose and of grafting upon one of the starting materials being used in the manufacture of the sponge would give only an improvement of 9 mg. (Example 2) and of 40 mg. of water per cc. of sponge (Example 3) i.e. only an improvement of 331% would be expected.

Example 5

This example relates to similar experiments to those of the preceding examples, but concerns polyester-polyurethane sponges.

The polyester comprises an equimolecular mixture of adipic acid and diethylene glycol and a 6% molecular proportion of trimethylolpropane.

(i) A sponge is prepared using the following ingredients:

| | Parts by wt. |
|---|---|
| Polyester | 100 |
| Mixture of 2.4 and 2.6 toluene diisocyanate | 47 |
| A.M. (as in Example 1) | 10 |

The sponge obtained does not sink in a bath of water and in the wiping test collects a quantity of water corresponding to 13 mg. per cc. of sponge.

(ii) If one adds to the preceding ingredients 1.5 parts by weight of polyvinyl alcohol containing 42% of alcohol groups esterified by means of acetic acid, a sponge is obtained which still does not sink in a bath of water and which in the wiping test collects a quantity of water corresponding to 18 mg. per cc. of sponge.

(iii) If in the ingredients of part (i) the 100 parts of non-grafted polyester are replaced by 100 parts of polyester ozonised under the same conditions as example 3 and grafted with 1.5% by weight of pure acrylamide by means of heating under vacuum for 1 hour at 130° C., an absorbent sponge is obtained which sinks when placed on a bath of water. In the wiping test it collects 48 mg. of water per cc. of sponge.

(iv) It is found that by using polyvinyl alcohol esterified as described with acetic acid, and also using a grafted polyester, a remarkably absorbent sponge is obtained after foaming. In fact the sponge thus obtained sinks in water, and in the wiping test collects 90 mg. of water per cc. of sponge, and not 53 mg., as would have been expected if there had been a simple addition of the effect due to the alcohol (part ii) and to the grafting (part (iii)).

Example 5 proves that the invention can be just as well applied to polyether-polyurethane sponges as to polyester-polyurethane sponges.

The polyethers and polyesters which are used in the invention are those which are conventionally used in the preparation of polyurethane sponges; their molecular weight is generally between 300 and 5,000.

Examples of suitable polyesters are products of the reactions of acids such as adipic acid with glycols such as diethylene glycol, triols such as trimethylolpropane or higher polyols; examples of suitable polyethers are reaction products, generally of propylene oxide, with glycols or preferably triols such as glycerol, hexanetriol, trimethylolpropane or even higher polyols.

These polyethers or polyesters are grafted by any method of grafting, such as irradiation, transferred with hydrophilic monomers; within the scope of the invention grafting by means of previous ozonisation is preferred. The monomers grafted are of the vinylidenic type and if they are polymerised alone, must give a polymer with marked hydrophilic character; among these monomers, will be mentioned the carboxylic acids, the anhydrides of carboxylic acids or the non-saturated polymerisable amides, such as acrylic acid, methacrylic acid, crotonic acid, cinnamic acid, aconitic acid, itaconic acid, maleic anhydride, itaconic anhydride, citraconic anhydride, acrylamide, and methacrylamide. Vinylpyrrolidone may also be used. These monomers can be used alone or copolymerised between themselves or with less than 50% of another monomer of slight hydrophilic character. The acid can be used in the free state or preferably after neutralisation by means of a mineral or organic use. Non-hydrophilic monomers such as vinyl acetate can also be used, vinyl acetate being transformed, or partly transformed, after polymerisation, into polyvinyl alcohol by the saponifying action of a base, to give a marked hydrophilic character. The quantity of grafted monomers must be sufficiently high for the absorbent character of the sponge to be well marked but not too high, so that the sponge retains the advantageous characteristics of the polyurethane sponges. The quantity is generally between 1 and 100% in weight of the total mass of polyether or polyester. Either polyether alone or grafter polyester (generally less than 10% in weight) or a mixture of these more strongly grafted ingredients (generally between 10 and 100%) and non-grafted ingredients, can be used. Generally speaking the sponge will be prepared with a formula comprising, besides polyisocyanate and the reaction catalysts, between 30 and 95 parts of non-grafted polyether or polyester, between 0.2 and 15 parts of hydrophilic polymer insoluble in water and between 1 and 70 parts of grafted polyether or polyester.

The polyisocynates are generally aliphatic, aromatic, cyclic or heterocyclic diisocyanates. Even thioisocyanates may be used.

The hydrophilic polymer which is insoluble in water and which is incorporated into the mixture to be used to prepare the sponges according to the invention may be other than cellulose, such as the cellulose ethers which are insoluble in water, partially hydrolysed or saponified polyvinyl acetates, or partially acetalised or esterified polyvinyl alcohol.

These products are generally used in powder form. They are described in detail in "Vinyl and related polymers" by Schildknecht, 1952, page 341 ff. where it is explained that polyvinyl alcohol may be modified by cross-linking under the action of heat or the action of formaldehyde to make it insoluble in water.

The polyvinyl alcohols must be sufficiently esterified to be insoluble in water but they must not be esterified too much, in order to preserve their hydrophilic character. Otherwise expressed, the level of esterification must be the minimum level from which the polyvinyl alcohols are insoluble. This level is in the vicinity of 25% as has been shown by Scholdknecht in the publication referred to above, which states (page 351) that polymers which show about 76–79% hydrolysis are soluble in cold water. This is equivalent to 24–21% of the polyvinyl alcohol remaining esterified. The ingredients although forming a novel combination are used according to conventional manufacturing procedures in order to produce a polyurethane sponge, such procedures being described in Chapter 5 of "Polyurethanes" by Dombrow, pages 170 to 188 (Reinhold Publishing Corporation, 3rd edition).

1. A process for the preparation of a water absorbent polyurethane sponge comprising the steps of preparing a mixture comprising an organic polyisocyanate, a hydrophilic polymer insoluble in water, selected from the group consisting of cellulose, partially hydrolysed polyvinyl acetates, partially acetalised polyvinyl alcohol and partially esterified polyvinyl alcohol, an activator mixture containing water, and at least one compound selected from the group consisting of polyethers having a monomer of hydrophilic character grafted thereon, said monomer being selected from the group consisting of unsaturated carboxylic acids, the anhydrides of unsaturated carboxylic acids, acrylamide, methacrylamide, vinylpyrrolidone and polyesters having a said monomer of hydrophilic character grafted thereon, the quantity of said grafted monomer being between 1 and 100% in weight of the total mass of said compound, foaming said mixture, and hardening the resulting foam at ambient tmperature.

2. An absorbent polyurethane sponge manufactured in accordance with the process set forth in claim 1.

3. A process according to claim 1, wherein said monomer of hydrophilic character is selected from the group consisting of acrylic acid, methacrylic acid, acrylamide and methacrylamide.

4. A process according to claim 1, wherein set monmer of hydrophilic character is grafted by previous ozonization.

References Cited
FOREIGN PATENTS 1,176,722  11/1958  France.
1,348,550  12/1963  France.

DONALD E. CZAJA, *Primary Examiner.*

LEON J. BERCOVITZ, *Assistant Examiner.*